United States Patent [19]

Baney et al.

[11] Patent Number: 4,757,035

[45] Date of Patent: Jul. 12, 1988

[54] CERAMIC MATERIALS WITH INCREASED CRYSTALLINITY FROM SILAZANE POLYMERS

[75] Inventors: Ronald H. Baney, Midland; Duane R. Bujalski, Monitor Township, Bay County, both of Mich.

[73] Assignee: Dow Corning Corporation, Midland, Mich.

[21] Appl. No.: 868,206

[22] Filed: May 23, 1986

Related U.S. Application Data

[63] Continuation-in-part of Ser. No. 652,939, Sep. 21, 1984, abandoned.

[51] Int. Cl.$^4$ .................. C04B 35/56; C04B 35/58
[52] U.S. Cl. ........................................ 501/88; 501/92; 501/97
[58] Field of Search .................. 501/88, 97, 92

[56] References Cited

U.S. PATENT DOCUMENTS 4,312,970 1/1982 Gaul ..................................... 526/279
4,340,619 7/1982 Gaul ..................................... 427/228

*Primary Examiner*—Mark L. Bell
*Attorney, Agent, or Firm*—Robert L. McKellar

[57] ABSTRACT

A method of preparing ceramic materials with increased levels of crystalline SiC and/or $Si_3N_4$ is described. The method consists of firing a mixture of a $R_3SiNH$-containing silazane polymer and an inorganic compound selected from the group consisting of iron compounds, cobalt compounds, nickel compounds, and copper compounds to an elevated temperature of at least 750° C. under an inert atmosphere or in a vacuum until a ceramic material with increased levels of crystalline SiC and/or $Si_3N_4$ is obtained.

27 Claims, No Drawings

CERAMIC MATERIALS WITH INCREASED CRYSTALLINITY FROM SILAZANE POLYMERS

This application is a continuation-in-part of application Ser. No. 652,939, filed Sept. 21, 1984, now abandoned.

BACKGROUND OF THE INVENTION

This invention relates to the preparation of ceramic materials with increased crystallinity. More specifically this invention relates to the preparation of ceramic materials with increased levels of crystalline SiC and/or $Si_3N_4$. The ceramic materials of this invention are obtained by firing a mixture of a $R_3SiNH$-containing silazane polymer and certain inorganic compounds to an elevated temperature in an inert atmosphere or in a vacuum. The additives that allow for ceramic materials with increased crystallinity include iron compounds, cobalt compounds, nickel compounds, and copper compounds.

Ceramic material prepared from $R_3SiNH$-containing silazane polymers are known to the art. Gaul in U.S. Pat. No. 4,340,619 (issued July 20, 1982), which is hereby incorporated by reference, prepared ceramic materials by firing at elevated temperatures in an inert atmosphere a $R_3SiNH$-containing silazane polymer prepared by contacting and reacting, in an inert, essentially anhydrous atmosphere, chlorine-containing disilanes with disilazanes. The ceramic material of U.S. Pat. No. 4,340,619 contained crystalline SiC and/or $Si_3N_4$ only when the $R_3SiNH$-containing silazane polymer was fired to at least 1600° C.

Gaul in U.S. Pat. No. 4,312,970, issued Jan. 26, 1984, which is hereby incorporated by reference, obtained ceramics by firing a $R_3SiNH$-containing silazane polymer, prepared by contacting and reacting an organochlorosilane with a disilazane, at elevated temperatures in an inert atmosphere or in a vacuum. The crystalline content of the ceramic materials was not reported.

What is newly discovered is that certain inorganic compounds when added to $R_3SiNH$-containing silazane polymer prior to firing at elevated temperatures, allow for the formation of ceramic materials with increased crystallinity relative to ceramic materials fired under the same conditions without the additives. The process of this invention allows for the formation of ceramic materials with increased levels of crystalline $Si_3N_4$ and/or SiC. The process of this invention also allows for the formation of ceramic materials containing crystalline $Si_3N_4$ and/or SiC at lower pyrolysis temperatures.

THE INVENTION

This invention relates to a method of preparing a ceramic material with increased crystallinity, said method comprising heating a modified $R_3SiNH$-containing silazane polymer in an inert atmosphere or in a vacuum to a temperature of at least 750° C. until said modified $R_3SiNH$-containing silazane polymer is converted to a ceramic material with increased crystallinity relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, crystallinity increasing, amount of an inorganic compound selected from the group consisting of iron compounds, cobalt compounds, nickel compounds, and copper compounds.

This invention also relates to a method of preparing a ceramic material with increased crystallinity, said method comprising heating a modified $R_3SiNH$-containing silazane polymer in an inert atmosphere or in a vacuum to a temperature of at least 750° C. until said modified $R_3SiNH$-containing silazane polymer is converted to a ceramic material with increased crystallinity relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, crystallinity increasing, amount of an inorganic compound selected from the group consisting of iron compounds, cobalt compounds, nickel compounds, and copper compounds, wherein said non-modified $R_3SiNH$-containing silazane polymer is prepared by contacting and reacting in an inert, essentially anhydrous atmosphere, a chlorine-containing disilane or a mixture of chlorine-containing disilanes of general formula $$(Cl_b R_c' Si)_2$$

with a disilazane of general formula $$(R_3Si)_2NH$$

at a temperature in the range of 25° C. to 300° C. while distilling by-produced volatile products, wherein R' is a vinyl group, an alkyl group of 1-3 carbon atoms, or a phenyl group; R is a hydrogen atom, a vinyl group, an alkyl group of 1-3 carbon atoms, or a phenyl group; b has a value 0.5-3; c has a value of 0-2.5; and the sum of (b+c) is equal to three.

This invention also relates to a method of preparing a ceramic material with increased crystallinity, said method comprising heating a modified $R_3SiNH$-containing silazane polymer in an inert atmosphere or in a vacuum to a temperature of at least 750° C. until said modified $R_3SiNH$-containing silazane polymer is converted to a ceramic material with increased crystallinity relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, crystallinity increasing, amount of an inorganic compound selected from the group consisting of iron compounds, cobalt compounds, nickel compounds, and copper compounds, wherein said non-modified $R_3SiNH$-containing silazane polymer is prepared by contacting and reacting in an inert, essentially anhydrous atmosphere, an organochlorosilane or a mixture of organochlorosilanes of general formula $$R_n'SiCl_{(4-n)}$$

with a disilazane of general formula $$(R_3Si)_2NH$$

at a temperature in the range of 25° C. to 300° C. while distilling by-produced volatile products, wherein R' is a vinyl group, an alkyl group of 1-3 carbon atoms, or a phenyl group; R is a hydrogen atom, a vinyl group, an alkyl group of 1-3 carbon atoms, or a phenyl group; and n has a value of 1 or 2.

The process of this invention is carried out by first mixing a $R_3SiNH$-containing silazane polymer with an effective amount of an inorganic compound and then firing the resulting mixture to an elevated temperature under an inert atmosphere or in a vacuum until the resulting mixture is converted to a ceramic material. Suitable inorganic additives for the practice of the invention include iron compounds, cobalt compounds, nickel compounds, and copper compounds. These inorganic compounds include organometallic compounds as detailed below.

Suitable iron compounds include iron (II) compounds, iron (III) compounds and zero valence iron compounds. Examples of suitable iron compounds include iron (II) bromide, iron (III) bromide, iron (II) ethylenediammonium sulfate, iron (II) oxalate, iron (III) octoate, iron (II) acetate, iron (III) acetate hydroxide, disodium tetracarbonylferrate, sodium pentacyanonitrosylferrate (III), pentacarbonyliron, ammonium trioxalatoferrate (III), ammonium hexacyanoferrate (II), potassium hexacyanoferrate (III), potassium trioxalatoferrate (III), potassium hexacyanoferrate (II), dicarbonylcyclopentadienyliodoiron, butadienetricarbonyliron, bis(cyclopentadienyl)iron, iron (II) acetylacetonate, ferrocene carbaldehyde, ferrocene carboxylic acid, ferrocene dicarboxylic acid, 1,1-dimethylferrocene, iron (II) gluconate, (dimethylamino methyl) ferrocene, n-butylferrocene, t-butyl ferrocene, iron (III) acetylacetonate, ferrocenyl phenyl ketone, iron (III) 2-ethylhexanoate, iron (II) chloride, iron (II) perchlorate, iron (III) chloride, iron (III) perchlorate, iron (II) fluoride, iron (III) fluoride, sodium hexafluoroferrate (III), ammonium iron (III) sulfate, ammonium iron (II) sulfate, iron (II) iodide, iron (III) nitrate, iron (II) oxide, iron (III) phosphate, iron (II) sulfate, iron (III) oxalate, nonacarbonyldiiron, tris(ethylenediamine)iron (III) sulfate, bis[dicarbonyl(methylcyclopentadenyl)iron], copper diiron tetraoxide, diiron nickel tetraoxide, iron (III) oxide, iron (III) sulfate, iron carbide, dodecacarbonyltriiron, iron (II) phosphate, iron nitride, and the like. Preferred iron compounds include iron (III) octoate, iron (III) oxide, iron (II) acetylacetonate, iron (III) chloride and nonocarbonyl diiron.

Suitable cobalt compounds include cobalt (II) compounds, cobalt (III) compounds, cobalt (IV) compounds, and zero valence cobalt compounds. Examples of suitable cobalt compounds include cobalt (II) tetrafluoroborate, cobalt (II) borate, cobalt (II) bromide, cobalt (II) carbonate, cobalt (II) thiocyanate, cobalt (II) oxalate, tricarbonylnitrosyl cobalt, cobalt (II) acetate, tris(ethylenediamine) cobalt (III) chloride, tris(ethylenediamine) cobalt (II) sulfate, potassium hexacyanocobaltate (III), cobalt (II) octoate, dicarbonylcyclopentadienyl cobalt, bis(cyclopentadienyl) cobalt, cobalt (II) acetylacetonate, cobalt (II) benzoate, cobalt (III) acetylacetonate, N,N'-bis(salicylidene) ethylenediimino cobalt (II), cobalt (II) cyclohexanebutyrate, cobalt (II) chloride, cobalt (II) perchlorate, pentaaminechloro cobalt (III) chloride, pentaamineaquocobalt (III) chloride, hexaamine cobalt (III) chloride, cobalt (II) fluoride, cobalt (III) fluoride, cobalt diiron tetraoxide, cobalt (II) hydroxide, cobalt (II) iodide, cobalt (II) nitrate, sodium hexanitritocobaltate (III), cobalt (II) oxide, cobalt (II) sulfate, cobalt (IV) sulfide, octacarbonyldicobalt, and the like. A preferred cobalt compound is cobalt (II) octoate.

Suitable nickel compounds include nickel (II) compounds, nickel (III) compounds, nickel (IV) compounds, and zero valence nickel compounds. Examples of suitable nickel compounds include nickel boride, nickel tetrafluoroborate, nickel (II) bromide, nickel (II) carbonate, nickel (II) oxalate, nickel (II) acetate, tetracarbonyl nickel, tri(ethylenediamine) nickel (II) sulfate, bis(cyclopentadienyl) nickel, nickel (II) acetoacetonate, bis(triethylphosphine) nickel (II) chloride, nickel (II) n-phenylglycinate, nickel (II) 2-ethylhexanoate, nickel cyclohexanebutyrate, nickel (II) chloride, nickel (II) perchlorate, nickel (II) fluoride, potassium hexafluoronickelate (IV), nickel hexafluorosilicate, diiron nickel tetraoxide, nickel (II) hydroxide, nickel (II) octoate, nickel sulfonate, ammonium nickel sulfate, nickel (II) iodide, nickel (II) nitrate, nickel (II) oxide, nickel (II) sulfate, nickel (II) sulfide, nickel (IV) sulfide, nickel (III) oxide, nickel phosphide, and the like. A preferred nickel compound is nickel (II) octoate.

Suitable copper compounds include copper (I) compounds and copper (II) compounds. Examples of suitable copper compounds include copper (II) tetrafluoroborate, copper (I) bromide, copper (II) bromide, copper (I) cyanide, copper (I) thiocyanate, copper (I) acetate, copper (II) acetate, copper (II) octoate, copper (I) t-butoxide, copper thiophenoxide, tri(ethylenediamine) copper (II) sulfate, disodium salt of ethylenediaminetetraacetic acid copper (II), copper (II) acetylacetonate, copper (II) octoate, copper (II) gluconate, copper salt of acetylsalicylic acid, copper (II) cyclohexanebutyrate, copper (I) chloride, copper (II) chloride, copper (II) perchlorate, copper (II) chromite, copper (II) fluoride, copper diiron tetraoxide, copper (II) hydroxide, copper (I) iodide, copper (I) iodate, copper (II) nitrate, copper (II) oxide, copper (II) sulfate, copper (III) sulfide, copper (II) carbonate dihydroxide, copper (I) oxide, copper (I) sulfide, copper (I) nitride, copper (I) phosphide, and the like. A preferred copper compound is copper (II) octoate.

Mixture of various iron compounds, cobalt compounds, nickel compounds, and copper compounds may also be employed.

The method of mixing the $R_3SiNH$-containing silazane polymer and the inorganic compound is not critical. It is preferred that the $R_3SiNH$-containing silazane polymer and the inorganic compound be well mixed in order to obtain ceramic materials or articles where the amount of crystalline $Si_3N_4$ and/or SiC does not vary appreciably throughout the ceramic material or article. Using an organic solvent such a toluene helps to insure that the two components are well mixed. When a solvent is employed to mix the $R_3SiNH$-containing silazane polymer and the inorganic material, the solvent should be removed by conventional means prior to heating the mixture to an elevated temperature in order form a ceramic material. The $R_3SiNH$-containing silazane polymer and the inorganic compounds may also be mixed on 3 roll mills by simply adding the ingredients and making several passes on the mill. As will be apparent to one of ordinary skill in the art, other mixing techniques may be used that will result in ceramic materials or articles with the level of crystallinity uniform throughout the ceramic material or article.

The $R_3SiNH$-containing silazane polymer is mixed with an effective amount of an inorganic compound. By "an effective amount" of the inorganic compound we mean that amount which results in increased crystallinity in the resulting ceramic material. Generally the inorganic compound is added at such a level so as to obtain a mixture containing the R₃SiNH-containing silazane polymer and about 0.1 to 2.0 weight percent of the metal associated with the inorganic compound. The inorganic compound may be added at higher levels although no added benefits are noted. The increase in crystallinity of the ceramic material of this invention is measured by comparison with the crystallinity of a ceramic material obtained by firing the same R₃SiNH-containing silazane polymer, without any added inorganic compounds, under the same experimental conditions.

The mixture of R₃SiNH-containing silazane polymer and an effective amount of an inorganic compound is fired to elevated temperatures of at least 750° C. under an inert atmosphere or in a vacuum until the mixture is converted to a ceramic material. A ceramic material with increased crystallinity is obtained. The crystallinity in the ceramic material may be in the form of alpha-Si N₄, beta-Si₃N₄, alpha-SiC, and/or beta-SiC. It has generally been found that the crystallinity of the ceramic material increases with increasing pyrolysis temperature. Therefore it is preferred that the R₃SiNH-containing silazane polymer and inorganic compound mixture be fired at a temperature of 1000° C. or higher until the mixture is converted to a ceramic material.

Although not wishing to be limited by theory, we believe that during pyrolysis the inorganic compounds are reduced to the metal and that, perhaps, the metal derived from the inorganic compound, in intimate contact on the atomic level with the components of the mixture, is responsible for the increase in crystallinity. Adding the metal alone does not seem to increase the crystallinity of the ceramic material, perhaps, because it is difficult to obtain intimate contact between the metal and other reactants. The in-situ formation of the metal by reduction of the inorganic compound during pyrolysis may insure intimate contact on a atomic or molecular level.

Silazane polymers suitable for use in the present invention are R₃SiNH-containing silazane polymers. R₃SiNH-containing silazane polymers especially useful in this invention are described in U.S. Pat. Nos. 4,312,970 and 4,340,619, all of which have been incorporated by reference.

The silazane polymers described in U.S. Pat. No. 4,312,970 are prepared by contacting and reacting in an inert, essentially anhydrous, atmosphere, an organochlorosilane or a mixture of organochlorosilanes of the general formula

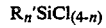

$R_n'SiCl_{(4-n)}$ with a disilazane having the general formula

$(R_3Si)_2NH$ at a temperature in the range of 25° C. to 300° C. while distilling by-produced volatile products, wherein R' is a vinyl group, an alkyl group of 1-3 carbon atoms, or a phenyl group; R' is a hydrogen atom, a vinyl group, an alkyl group of 1-3 carbon atoms, or a phenyl group; and n has a value of 1 or 2.

The organochloromonosilanes of U.S. Pat. No. 4,312,970 are those having the general formula

$R_n'SiCl_{(4-n)}$ where R' is vinyl or an alkyl radical containing 1-3 carbon atoms or the phenyl group. Thus, those groups which are contemplated as being useful in this invention are methyl, ethyl, propyl, vinyl and phenyl. The R' groups can all be the same or they can be different.

The value of n is 1 or 2. Thus, single organic group substituted silanes such as CH₃SiCl₃, C₆H₅SiCl₃, CH₂=CHSiCl₃, CH₃CH₂SiCl₃ or CH₃(CH₂)₂SiCl₃ and double organic group substituted silanes such as (CH₃)₂SiCl₂, (C₂H₅)₂SiCl₂ and (CH₂=CH)(CH₃)SiCl₂ and mixtures of such silanes, for example CH₃SiCl₃ and (CH₃)₂SiCl₂, can be used. It is preferred that when organochlorosilane mixtures are used, the number of units of diorgano-substituted silicon atoms should not exceed the number of units of monoorgano-substituted silicon atoms.

The silazane polymers of U.S. Pat. No. 4,340,619 which are the most preferred silazane polymers for the practice of this invention, are prepared by contacting and reacting in an inert, essentially anhydrous, atmosphere, a chlorine-containing disilane or a mixture of chlorine-containing disilanes, of the general formula

$(Cl_bR_c'Si)_2$ with a disilazane having the general formula

$(R_3Si)_2NH$ at a temperature in the range of 25° C. to 300° C. while distilling by-produced volatile products, wherein R' is a group, an alkyl group of 1-3 carbon atoms, or a phenyl group; R' is a hydrogen atom, a vinyl group, an alkyl group of 1-3 carbon atoms, or phenyl group; b has a value of 0.5-3; c has a value of 0-2.5; and the sum of (b+c) is equal to three.

The chlorine-containing disilanes of U.S. Pat. No. 4,340,619 are those disilanes having the general formula

$(Cl_bR_c'Si)_2$ where R' is vinyl, an alkyl radical containing 1-3 carbon atoms or the phenyl group. Thus, the R' groups are methyl, ethyl, propyl, vinyl and phenyl. The R' groups can all be the same or they can be different. The chlorine-containing disilanes can be those found in the residue from the Direct Process for producing halosilanes (Eaborn, C., "Organosilicon Compounds", Butterworth Scientific Publications, London, 1960, pg. 1). The Direct Process is the reaction between silicon metal and aliphatic halides, generally methyl chloride, at elevated temperature in the presence of catalyst, generally copper, to produce chlorosilanes.

For the chlorine-containing disilanes described above, the value of b and c is from 0.5-3 and 0-2.5, respectively, and the sum of (b+c) is equal to three. Examples of chlorine-containing disilanes are [Cl(CH₃)₂Si]₂, [Cl₂(CH₃)Si]₂, [Cl₂(C₂H₅)Si]₂, [Cl(C₆H₅)₂Si]₂, and [Cl₂=CH)Si]₂.

Monosilanes can also be used in admixtures with the above described chlorine-containing disilanes. Examples include CH₃SiCl₃, (CH₃)₂SiCl₂, H(CH₃)₂SiCl, (CH₃)₃SiCl, (CH₂=CH)(CH₃)₂SiCl, (C₂H₅)₂SiCl₂, C₆H₅SiCl₃, as well as (C₆H₅)₂SiCl₂, and (C₆H₅)₃SiCl.

When polysilazane polymers are prepared in accordance with U.S. Pat. No. 4,340,619 for use in this invention it is preferred that mixtures of chlorine-containing disilanes be employed where the number of units of diorgano-substituted silicon atoms does not exceed the number of units of monoorgano-substituted silicon atoms.

The second reactant in U.S. Pat. No. 4,312,970 and U.S. Pat. No. 4,340,619 is a disilazane of the general formula $(R_3Si)_2NH$. R in this formula is vinyl, hydrogen, an alkyl radical of 1-3 carbon atoms or the phenyl group. Therefore, R, for purposes of this formula is represented by hydrogen, methyl, ethyl, propyl, vinyl and phenyl. Each R group in this formula can be the same or they can be different. Examples of the disilazanes include:

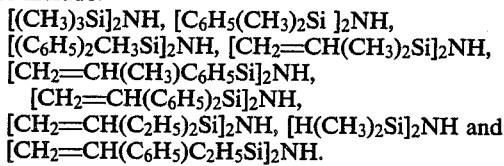

$[(CH_3)_3Si]_2NH$, $[C_6H_5(CH_3)_2Si]_2NH$,
$[(C_6H_5)_2CH_3Si]_2NH$, $[CH_2{=}CH(CH_3)_2Si]_2NH$,
$[CH_2{=}CH(CH_3)C_6H_5Si]_2NH$,
  $[CH_2{=}CH(C_6H_5)_2Si]_2NH$,
$[CH_2{=}CH(C_2H_5)_2Si]_2NH$, $[H(CH_3)_2Si]_2NH$ and
$[CH_2{=}CH(C_6H_5)C_2H_5Si]_2NH$.

These reactants are brought together in an inert, essentially anhydrous atmosphere. By "inert" we mean that the reaction is carried out under a blanket of inert gas, such as argon, nitrogen, or helium. What we mean by "essentially anhydrous" is that the reaction is preferably carried out in an absolutely anhydrous atmosphere but minute amounts of moisture can be tolerated.

When the reactants are contacted with each other, as described in U.S. Pat. Nos. 4,312,970 and 4,340,619 the reaction begins which forms an intermediate amino compound. Upon heating, additional amino compound is formed and upon continued heating, $R_3SiCl$ is distilled from the reaction mixture and a silazane polymer is formed. The order of addition of the materials does not appear to be critical. As the temperature is raised higher, more condensation takes place and cross-linking occurs with residual $R_3Si$- that is not distilled from the mixture acting as a chain-stopper. This control allows one to stop the reaction at any point to obtain almost any desired viscosity. The desirable temperature range for this reaction is 25° C. to 300° C. A preferred temperature range for this reaction is 125°-300° C. The length of time that the reaction requires depends on the temperature employed and the viscosity one wishes to achieve.

What is meant by "volatile products" are the distillable by-produced products that are formed by the reactions set forth above. These materials can be represented by $(CH_3)_3SiCl$, $(CH_2{=}CH)(C_6H_5)_2SiCl$, $CH_3(C_6H_5)_2SiCl$, $(CH_3)_2C_6H_5SiCl$ and $(CH_2{=}CH)(CH_3)_2SiCl$. Sometimes, the process requires the use of a vacuum along with the heat in order to remove these materials from the reaction mixture.

After the $R_3SiNH$-containing silazane polymer and the inorganic compound are mixed, the mixture is fired to an elevated temperature of at least 750° C. until the mixture is converted to a ceramic material. It is generally preferred that the $R_3SiNH$-containing silazane polymer and inorganic compound mixture be vacuum stripped prior to pyrolysis. If the silazane polymer and inorganic compound mixture is of sufficient viscosity or it it possesses a sufficiently low melt temperature, it can be shaped first and then pyrolyzed to give a silicon nitride-containing shaped article such as a fiber. The silizane polymer and inorganic compound mixture can be filled with ceramic type fillers (if desired) and then fired to at least 750° C. to obtain ceramic materials or ceramic articles.

The silazane polymer and inorganic compound mixtures of this invention can be used in both the filled and unfilled state, depending on the application. Thus, it is contemplated within the scope of this invention to coat substrates with filled and unfilled mixtures and heat the substrates to produce ceramic coated articles. Fillers and adjuvants can be milled on 3 roll mills by simply mixing the polymers and inorganic compounds of this invention with the fillers and making several passes on the mill. In the alternative, the polymers and inorganic compounds can be placed in solvents and the fillers and adjuvants can be added thereto and after mixing the solvent can be removed to give the filled polymer mixture. The coating can be carried out by conventional means. The means used depends on the polymer mixture and substrates used and the application one has in mind. Thus, these materials can be brushed, rolled, dipped or sprayed. In the filled state, it is sometimes necessary to trowel the mixture onto the substrate. The silazane polymer and inorganic compound mixtures of this invention may also be used as an infiltrant with ceramic materials or as a matrix material for composites. Other uses will be apparent to those skilled in the art from a consideration of this specification.

So that those skilled in the art can better appreciate and understand the invention, the following examples are given.

In the examples, three basic mixing techniques were employed to mix the $R_3SiNH$-containing silazane polymer and the inorganic compounds.

I. Solution method. For inorganic compounds soluble in toluene a solution method for mixing was generally employed. The desired amount of inorganic compound additive was dissolved in dry toluene. The $R_3SiNH$-containing silazane polymer was added to the toluene solution to give a 35 weight percent solution. The resulting solution was placed in a glass jar, purged with argon, and then sealed. The solution was then agitated for 16 hours on a wheel mixer. Solvent was removed from the modified $R_3SiNH$-containing silazane by vacuum stripping for three hours at 25° C. and 3 mm Hg and for one hour at 50° C. and 2 mm Hg. On occasion, other solvents such as acetone, hexane, or mineral spirits were employed.

For inorganic compounds insoluble in toluene one of the two following methods were employed.

II. Wet milling method. The required amount of inorganic compound was added to a 50 weight percent solution of the $R_3SiNH$-containing silazane polymer in dry toluene in a half-pint mill jar. After adding ceramic milling balls, the jar was purged with argon and sealed. The sample was wet milled for 16 hours. The solvent was removed as in the solution method. On occasion, other solvents such as acetone, hexane, or mineral spirits were used.

III. Dry milling method. The required amount inorganic compound was added to powdered $R_3SiNH$-containing silazane polymer in a half-pint milling jar. The silazane polymer had been powdered in a mortar and pestle. After the addition of ceramic milling balls, the milling jar was purged with argon and sealed. The sample was milled for 16 hours.

All mixed samples were stored under argon in a dry box until used.

All samples were fired under a helium atmosphere in an Astro Industries Furnace 1000A water cooled graphite heated model 1000.3060-FP-12 equipped with a model 5300 Data Trak Temperature Programmer. The following temperature programs were employed for firing. Using Program A the temperature was raised to 600° C. at a rate of 2.8° C./min, raised from 600° to 800° C. at a rate of 3.3° C./min, raised from 800° to 900° C. at a rate of 8.3° C./min, held at 900° C. for 12 minutes and then cooled at a rate of 25° C./min. With Program B the temperature was increased to 600° C. at a rate of 2.9° C./min, increased from 600° to 900° C. at a rate of 3.8° C./min, held at 900° C. for 12.4 hours, then cooled at a rate of 11.2° C./min. With Program C the temperature was raised to 600° C. at a rate of 2.8° C./min, raised from 600° to 800° C. at a rate of 3.3° C./min, raised from 800° to 1000° C. at a rate of 16.7° C./min, held at 1000° C. for 24 minutes, and then cooled at a rate of 41.7° C./min. Using Program D, the temperature was raised to 600° C. at a rate of 2.8° C./min, raised from 600° to 800° C. at a rate of 4° C./min, raised from 800° to 1150° C. at a rate of 17.5° C./min, held at 1150° C. for 12.4 hours, and then cooled at a rate of 14.4° C./min. In Program E the temperature was increased to 600° C. at a rate of 2.8° C./min, increased from 600° to 800° C. at a rate of 3.3° C./min, increased from 800° to 1300° C. at the rate of 41.7° C./min, held at 1300° C. for 12 minutes, and then cooled at a rate of 36° C./min. With Program F, the temperature was raised to 800° C. at a rate of 1.3° C./min, raised from 800° to 1300° C. at a rate of 25° C./min, held at 1300° C. for 53 minutes, and then cooled at a rate of 49° C./min. Using Program G the temperature was increased to 600° C. at a rate of 2.7° C./min, increased from 600° to 800° C. at a rate of 0.3° C./min, increased from 800° to 1300° C. at a rate of 6.2° C./min, held at 1300° C. for 2 hours, and then cooled at 10.8° C./min. With Program H the temperature was increased to 600° C. at a rate of 2.8° C./min, increased from 600° to 800° C. at a rate of 6.2° C./min, increased from 800° to 1600° C. at a rate of 29.2° C./min, held at 1600° C. for 12 minutes, and then cooled at a rate of 44.4° C./min. Using Program I, the temperature was increased to 600° C. at a rate of 3.0° C./min, increased from 600° to 800° C. at a rate of 0.3° C./min. increased from 800° to 1600° C. at a rate of 10° C./min, held at 1600° C. for 2 hours, and then cooled at a rate of 13.3° C./min.

Both qualitative and quantitative X-ray diffraction determinations were made on the ceramic materials. Quantitative X-ray diffraction determinations were made using the procedure outlined in L. K. Frevel and W. C. Roth, *Anal. Chem.*, 54, 677–682 (1982). Qualitative X-ray diffraction determinations were carried out using standard procedures. For the qualitative work it was not possible to identify β-SiC in the presence of α-SiC with certainty because the X-ray diffraction peaks of α-SiC overlap the peaks of β-SiC. All ceramic materials produced by the method of this invention which were examined by the quantitative method contained both α-SiC and β-SiC (see Example 5). It seems likely, therefore, that the ceramics prepared by the method of this invention which were only examined by qualitative X-ray diffraction also contained both α-SiC and β-SiC. However, because of the limitations of the method only α-SiC could be positively identified.

Ceramic yield was calculated by dividing the weight after firing by the weight before firing and multiplying the result by 100.

In the examples, control samples were subjected to the same treatment (i.e., solution wet milling, or dry milling mixing methods) as the inorganic compound-containing silazane polymers except that the control samples did not contain the inorganic compound. The crystallinity of ceramics prepared from control samples subjected to the mixing procedures and control samples not subjected to the mixing procedures was essentially identical.

EXAMPLE 1

A $R_3SiNH$-containing silazane polymer prepared by the procedure outlined in U.S. Pat. No. 4,340,619 was employed in this example. In a 72 liter stainless steel reactor hexamethyldisilazane (42.2 pounds) and a mixture of methylchlorodisilanes (26 pounds) were combined under a nitrogen atmosphere. The methylcholordisilane mixture, obtained from the Direct Process, contained 42.5 weight percent $[(CH_3)Cl_2Si]_2$, 35.6 weight percent $(CH_3)_2ClSiSiCl_2(CH_3)$, 9.5 weight percent $[(CH_3)_2ClSi]_2$, and 12.4 weight percent of chlorosilane low boilers. The reaction mixture was heated to 195° C. under nitrogen at a rate of 0.97° C./min while volatile by-products were removed by distillation. The polymer residue was collected and was found to have a softening point of 68° C.

Several different inorganic compounds were added to the $R_3SiNH$-containing silazane polymer at levels to yield a 1 percent by weight, based on the metal, mixture. The additives used were iron (III) octoate, cobalt (II) octoate, copper (II) octoate, and nickel (II) octoate. All were mixed using the solution method with toluene as the solvent. A control sample, which contained no additives, was also subjected to the same procedure. All samples were then fired to 1300° C. under helium using temperature program E. After firing all samples were examined by x-ray diffraction.

TABLE I

| Additive | Ceramic Yield, % | Crystalline Phases Observed |
|---|---|---|
| NONE (Control) | 52.5 | NONE, AMORPHOUS |
| iron (III) octoate | 48.5 | α-SiC, α-Si$_3$N$_4$ |
| cobalt (II) octoate | 52.8 | α-SiC, α-Si$_3$N$_4$ |
| copper (II) octoate | 51.7 | α-SiC, α-Si$_3$N$_4$ |
| nickel (II) octoate | 54.3 | α-SiC, α-Si$_3$N$_4$ |

EXAMPLE 2

This example shows the use of various iron compounds as crystallinity enhancing additives. The same $R_3SiNH$-containing silazane polymer as described in Example 1 was used. The amount of additive used was such that the resulting modified silazane polymer contained 1.0 percent by weight iron. All additives, except iron oxide, were mixed with the silazane polymer using the solution method. Iron oxide was added using the dry milling technique. All samples were then fired to 1300° C. under helium using temperature program E. Fired samples were examined by X-ray diffraction. The results are presented in Table II.

TABLE II

| Additive | Ceramic Yield, % | Crystalline Phases Observed |
|---|---|---|
| NONE (Control) | 52.5 | NONE, AMORPHOUS |
| Iron (III) octoate | 48.5 | α-SiC, α-Si$_3$N$_4$ |
| Iron (III) oxide | 54.6 | α-SiC, α-Si$_3$N$_4$ |
| Iron (II) acetylacetonate | 44.1 | α-SiC, α-Si$_3$N$_4$ |
| Iron (III) chloride | 52.4 | α-SiC, α-Si$_3$N$_4$ |
| Nonocarbonyldiiron | 53.3 | α-SiC, α-Si$_3$N$_4$ |

EXAMPLE 3

This example shows the use of an iron (III) octoate crystallinity enhancing agent at various additive levels. The same $R_3SiNH$-containing silazane polymer as described in Example 1 was employed. Additives were incorporated into the silazane polymer using either the solution or wet milling technique. After mixing the additive into the silazane polymer, the silazane polymer was fired at 1300° C. under helium using temperature program E. The ceramic products were examined by X-ray diffraction. The results are presented in Table III. The X-ray diffraction peaks for the ceramic material from the 0.1 percent iron containing silazane polymer were not well defined. Ceramic materials prepared from the other iron containing silazane polymers gave well defined X-ray diffraction peaks corresponding to the noted crystalline phases.

TABLE III

| Additive Level, Wt % as Fe | Mixing Method | Ceramic Yield, % | Crystalline Phase Observed |
|---|---|---|---|
| 0 | Solution | 52.5 | NONE, AMORPHOUS |
| 0.1 | Solution | 53.3 | α-SiC, α-Si$_3$N$_4$ |
| 0.3 | Wet Milling | 52.7 | α-SiC, α-Si$_3$N$_4$ |
| 1.0 | Solution | 48.5 | α-SiC, α-Si$_3$N$_4$ |

EXAMPLE 4

This example shows the preparation of ceramic material by firing iron (III) octoate containing silazane polymers under varying pyrolysis temperatures and conditions. The $R_3SiNH$-containing silazane polymer described in Example 1 was used. Iron (III) octoate was incorporated into the silazane polymer at a level equivalent to 1.0 weight percent iron using the wet milling method. After firing the ceramic material was examined by X-ray diffraction. The results are presented in Table IV. All samples were fired in a helium atmosphere.

TABLE IV

| Additive | Temp Program | Time at Pyrolysis Temp, hr | Pyrolysis Temp, °C. | Ceramic Yield, % | Crystalline Phases Observed |
|---|---|---|---|---|---|
| NONE | B | 12.5 | 900 | 58.1 | NONE, AMORPHOUS |
| Fe | A | 0.4 | 900 | 57.0 | NONE, AMORPHOUS |
| Fe | B | 12.5 | 900 | 56.7 | α-SiC, α-Si$_3$N$_4$ |
| NONE | C | 0.4 | 1000 | 55.7 | NONE, AMORPHOUS |
| Fe | C | 0.4 | 1000 | 56.9 | α-SiC, α-Si$_3$N$_4$ |
| NONE | D | 12.4 | 1150 | 56.4 | NONE, AMORPHOUS |
| Fe | D | 12.4 | 1150 | 55.3 | α-SiC, α-Si$_3$N$_4$ |
| NONE | E | 0.2 | 1300 | 55.5 | NONE, AMORPHOUS |
| Fe | E | 0.2 | 1300 | 52.6 | α-SiC, α-Si$_3$N$_4$ |
| NONE | G | 2.0 | 1300 | 51.8 | NONE, AMORPHOUS |
| Fe | G | 2.0 | 1300 | 45.1 | α-SiC, α-Si$_3$N$_4$ |
| NONE | H | 0.2 | 1600 | — | NONE, AMORPHOUS |
| Fe | H | 0.2 | 1600 | — | α-SiC, α-Si$_3$N$_4$ |
| NONE | I | 2 | 1600 | — | β-SiC |
| Fe | I | 2 | 1600 | — | α-SiC, α-Si$_3$N$_4$ |

EXAMPLE 5

This example gives quantative X-ray diffraction data for ceramic materials prepared from $R_3SiNH$-containing silazane polymer with and without iron additives. The $R_3SiNH$-containing silazane polymer was the same as used in Example 1. The iron additives were incorporated into the silazane polymer at levels sufficient to give 1.0 weight percent iron using the wet milling technique. The additives employed were iron (III) oxide and iron (III) octoate. Samples were fired under helium using various firing conditions. The resulting ceramic materials were then examined by quantitative X-ray diffraction. The results are presented in Table V.

TABLE V

| Additive | Temp Program | Time at Pyrolysis Temp, °C. | Pyrolysis Temp, °C. | Ceramic Yield, % | Crystalline Phases, % | | |
|---|---|---|---|---|---|---|---|
| | | | | | α-SiC | β-SiC | α-Si$_3$N$_4$ |
| NONE | E | 0.2 | 1300 | 56.8 | 0 | 0 | 0 |
| Fe$_2$O$_3$ | E | 0.2 | 1300 | 57.6 | 12 | 8 | 10 |
| Fe(OOC(CH$_2$)$_6$CH$_3$)$_3$ | E | 0.2 | 1300 | 52.5 | 12 | 8 | 14 |
| NONE | G | 2 | 1300 | 54.9 | 0 | 0 | 0 |
| Fe$_2$O$_3$ | G | 2 | 1300 | 49.2 | 23 | 15 | 14 |
| Fe(OOC(CH$_2$)$_6$CH$_3$)$_3$ | G | 2 | 1300 | 46.1 | 21 | 13 | 19 |
| NONE | I | 2 | 1600 | 50.7 | 0 | 0 | 0 |
| NONE | I | 2 | 1600 | 39.3 | 0 | 10 | 0 |
| Fe$_2$O$_3$ | I | 2 | 1600 | 47.4 | 17 | 17 | 5 |
| Fe(OOC(CH$_2$)$_6$CH$_3$)$_3$ | I | 2 | 1600 | 44.8 | 24 | 17 | 14 |

EXAMPLE 6

This example shows the preparation of ceramic fibers using the process of this invention. The $R_3SiNH$-containing silazane polymer of Example 1 was employed. The inorganic compounds were incorporated into the $R_3SiNH$-containing silazane polymer at levels to give 1.0 weight percent of the metal using the wet milling technique. A melt rheometer equipped with a ⅜ inch barrel was employed to prepare fibers from silazane polymers containing nickel (II) octoate and cobalt (II) octoate as well as the control (no additive). Fiber from a silazane polymer containing iron (III) octoate were prepared on an extruder equipped with a 10 micron spinning head. Fibers were cured for 3 hours at 80° C. in air prior to firing. The fibers were then fired under helium at 1300° C. using Program F except for the control fibers which were fired under helium at 1300° C. using Program E. The fired ceramic fibers were then ground in a mortar and pestle and examined by X-ray diffraction. The results are presented in Table VI.

TABLE VI

| Additive | Spinning Temp, °C. | Average fiber diameter | Ceramic Yield, % | Crystalline Phases Observed |
|---|---|---|---|---|
| NONE | 109 | — | 59.7 | NONE, AMORPHOUS |
| nickel (II) octoate | 140–150 | — | 42.3 | α-SiC, α-Si$_3$N$_4$ |
| cobalt (II) octoate | 115 | — | 38.6 | α-SiC, α-Si$_3$N$_4$ |
| iron (III) octoate | 110 | 30–40 | 31.8 | α-SiC |

EXAMPLE 7

This example shows the use of mixtures of crystallinity enhancing additives. The R$_3$SiNH-containing silazane polymer of example 1 was employed. A mixture of the R$_3$SiNH-containing silazane polymer containing 0.5 weight percent nickel and 0.5 percent iron was prepared by the wet milling method using nickel (II) octoate and iron (III) octoate as the additives. The modified silazane polymer was fired under helium to 1300° C. using Program E. A ceramic material (53.0 percent ceramic yield) was obtained which contained α-SiC and α-Si$_3$N$_4$ by X-ray diffraction.

Another R$_3$SiNH-containing silazane polymer which contained 0.5 weight percent copper and 0.5 weight percent iron was also prepared by the wet milling technique using copper (II) octoate and iron (III) octoate. The modified silazane polymer was fired to 1300° C. under helium using Program E. A ceramic material (65.3 percent ceramic yield) was obtained which contained α-SiC and α-Si$_3$N$_4$ as cyrstalline phases.

EXAMPLE 8

This example is included for comparison only. The R$_3$SiNH-containing silazane polymer of Example 1 was used. Numerous inorganic compounds or metals were evaluated as crystallinity enhancing agents. The general procedures of Examples 1–7 were used. The additives were incorporated into the R$_3$SiNH-containing polymer at a level of about 1 weight percent of the element and, thereafter, the modified silazane polymers were fired at an elevated temperature in the range of 100020–1600° C. under an inert atmosphere. The resulting ceramic materials were then examined by X-ray diffraction. The additives examined are listed in Table VII.

None of the listed additives were found to enhance crystallinity to any significant extent. Most of the resulting ceramic materials were amorphous.

TABLE VII

| Additives Which Did Not Enhance Crystallinity | |
|---|---|
| Element | Additive |
| Al | Aluminum sec-butoxide |
|  | Aluminum oxide |
|  | Aluminum acetyacetonate |
| Ba | Barium octoate |
| B | Trimethoxy boron |
|  | Boric acid |
|  | Sodium tetraborate |
| C | Carbon black |
| Ce | Cerium (III) octoate |
| Cr | Chromium metal |
| Hf | Bis(cyclopentadienyl)hafnium dichloride |
| In | Indium isopropoxide |
| Ir | Bis(triphenylphosphine)iridium chloride |
| Pb | Lead (II) octoate |
| Mg | Ethyl magnesium bromide |
| Mn | Manganese (II) octoate |
|  | Manganese (IV) octoate |
| Hg | Mercury (II) octoate |
| Mo | Molybdenum (VI) octoate |
| Ni | Nickel metal |
| Os | Ammonia hexabromoosmate |
| Pd | Palladium (II) acetylacetonate |
| P | Phosphoric acid |
| Pt | Chloroplatinic acid |
| Rh | Rhodium chloride |
| Ru | Ruthenium acetylacetonate |
| Ag | Silver nitrate |
| Sr | Strontium acetylacetonate |
| S | Elemental sulfur |
| Sn | Tin metal |
|  | Tin (II) laurate |
| Ti | Titanium dioxide |
| W | Mesitylene tricarbonyl tunstate |
| V | Vanadium metal |
|  | Vanadium (III) acetylacetonate |
| Y | Yittrium acetylacetonate |
| Zn | Zinc metal |
|  | Zinc (II) octoate |
| Zr | Zirconium octoate |
| Ti/C | Titanium dioxide and carbon black |
| Pt/C | Chloroplatinic acid and carbon black |

That which is claimed is:

1. A method of preparing a ceramic material with increased crystallinity, said method comprising heating a modified R$_3$SINH-containing silazane polymer in an inert atmosphere or in a vacuum to a temperature of at least 750° C. until said modified R$_3$SiNH- containing silazane polymer is converted to a ceramic material with increased crystallinity relative to a non-modified R$_3$SiNH-containing silazane polymer heated under the same conditions, wherein said modified R$_3$SiNH-contianing silazane polymer is prepared by mixing the non-modified R$_3$SiNH-containing silazane polymer with an effective, crystallinity increasing, amount of an inorganic compound selected form the group consisting of iron III oxide, iron III octoate, iron II acetylacetonate, iron III chloride, cobalt II octoate, copper II octoate, nickel II octoate and noncarbonyldiiron.

2. A process as defined in claim 1 wherein said non-modified R$_3$SiNH-containing silazane polymer is prepared by contacting and reacting in an inert, essentially anhydrous atmosphere, a chlorine-containing disilane or a mixture of chlorine-containing disilanes of general formula

$(Cl_b R_c' Si)_2$ with a disilazane of general formula

$(R_3Si)_2NH$ at a temperature in the range of 25° C. to 300° C. while distilling by-produced volatile products, wherein R' is a vinyl group, an alkyl group of 1–3 carbon atoms, or a phenyl group; R is a hydrogen atom, a vinyl group, an alkyl group of 1–3 carbon atoms, or a phenyl group; b has a value of 0.5–3; c has a value of 0–2.5; and the sum of (b+c) is equal to three.

3. A process as defined in claim 1 wherein said non-modified R₃SiNH-containing silazane polymer is prepared by contacting and reacting in an inert, essentially anhydrous atmosphere, an organochlorosilane or a mixture of organochlorosilanes of general formula $$R_n'SiCl_{(4-n)}$$

with a disilazane of general formula $$(R_3Si)_2NH$$

at a temperature in the range of 25° C. to 300° C. while distilling by-produced volatile products, wherein R' is a vinyl group, an alkyl group of 1-3 carbon atoms, or a phenyl group; R is a hydrogen atom, a vinyl group, an alkyl group of 1-3 carbon atoms, or a phenyl group; and n has a value of 1 or 2.

4. A method as defined in claim 1 wherein said modified R₃SiNH-containing silazane polymer is heated to a temperature of at least 1000° C.

5. A method as defined in claim 2 wherein said modified R₃SiNH-containing silazane polymer is heated to a temperature of at least 1000° C.

6. A method as defined in claim 3 wherein said modified R₃SiNH-containing silazane polymer is heated to a temperature of at least 1000° C.

7. A method as defined in claim 4 wherein said iron compound is selected from the group consisting of iron (III) octoate, iron (III) oxide, iron (II) acetylacetonate, iron (III) chloride, and nonocarbonyl diiron.

8. A method as defined in claim 5 wherein said iron compound is selected from the group consisting of iron (III) octoate, iron (III) oxide, iron (II) acetylacetonate, iron (III) chloride, and nonocarbonyl diiron.

9. A method as defined in claim 6 wherein said iron compound is selected from the group consisting of iron (III) octoate, iron (III) oxide, iron (II) acetylacetonate, iron (III) chloride, and nonocarbonyl diiron.

10. A method as defined in claim 4 wherein said cobalt compound is cobalt (II) octoate.

11. A method as defined in claim 5 wherein said cobalt compound is cobalt (II) octoate.

12. A method as defined in claim 6 wherein said cobalt compound is cobalt (II) octoate.

13. A method as defined in claim 4 wherein said nickel compound is nickel (II) octoate.

14. A method as defined in claim 5 wherein said nickel compound is nickel (II) octoate.

15. A method as defined in claim 6 wherein said nickel compound is nickel (II) octoate.

16. A method as defined in claim 4 wherein said copper compound is copper (II) octoate.

17. A method as defined in claim 5 wherein said copper compound is copper (II) octoate.

18. A method as defined in claim 6 wherein said copper compound is copper (II) octoate.

19. A ceramic material as prepared by the method of claim 1.

20. A ceramic material as prepared by the method of claim 2.

21. A ceramic material as prepared by the method of claim 3.

22. A ceramic material as prepared by the method of claim 4.

23. A ceramic material as prepared by the method of claim 5.

24. A ceramic material as prepared by the method of claim 6.

25. A method of preparing a ceramic material with increased crystallinity, said method comprising heating a modified R₃SiNH-containing silazane polymer in an inert atmosphere or in a vacuum to a temperature of at least 1000 degrees C. until said modified R₃SiNH-containing silazane polymer is converted to a ceramic material with increased crystallinity relative to a non-modified R₃SiNH-containing silazane polymer heated under the same conditions wherein said increased crystallinity is in the form of increased levels of alpha-SiC, beta-SiC, alpha-Si₃N₄, or beta-Si₃N₄, wherein said modified R₃SiNH-containing silazane polymer is prepared by mixing the non-modified R₃SiNH-containing silazane polymer with an effective, crystallinity increasing amount of an inorganic compound selected from the group consisting of iron III oxide, iron III octoate, iron II acetylacetonate, iron III chloride, cobalt II octoate, copper II octoate, nickel II octoate and noncarbonyldiiron.

26. A method as defined in claim 25 wherein said non-modified R₃SiNH-containing silazane polymer is prepared by contacting and reacting in an inert, essentially anhydrous atmosphere, a chlorine-containing disilane or a mixture of chlorine-containing disilanes of general formula $$(Cl_bR_c'Si)_2$$

with a disilazane of general formula $$(R_3Si)_2NH$$

at a temperature in the range of 25° C. to 300° C. while distilling by-produced volatile products, wherein R' is a vinyl group, an alkyl group of 1-3 carbon atoms, or a phenyl group; R is a hydrogen atom, a vinyl group, an alkyl group of 1-3 carbon atoms, or a phenyl group; b has a value of 0.5-3; c has a value of 0-2.5; and the sum of (b+c) is equal to three.

27. A method as defined in claim 25 wherein said non-modified R₃SiNH-containing silazane polymer is prepared by contacting and reacting in an inert, essentially anhydrous atmosphere, an organochlorosilane or a mixture of organochlorosilanes of general formula $$R_n'SiCl_{(4-n)}$$

with a disilazane of general formula $$(R_3Si)_2NH$$

at a temperature in the range of 25° C. to 300° C. while distilling by-produced volatile products, wherein R' is a vinyl group, an alkyl group of 1-3 carbon atoms, or a phenyl group; R is a hydrogen atom, a vinyl group, an alkyl group of 1-3 carbon atoms, or a phenyl group; and n has a value of 1 or 2.

* * * * *